(12) United States Patent
Ng

(10) Patent No.: US 10,291,612 B2
(45) Date of Patent: May 14, 2019

(54) BI-DIRECTIONAL AUTHENTICATION BETWEEN A MEDIA REPOSITORY AND A HOSTING PROVIDER

(71) Applicant: Go Daddy Operating Company, LLC, Scottsdale, AZ (US)

(72) Inventor: Samuel Y. Ng, Bellevue, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 283 days.

(21) Appl. No.: 15/077,081

(22) Filed: Mar. 22, 2016

(65) Prior Publication Data

US 2017/0279802 A1 Sep. 28, 2017

(51) Int. Cl.
*H04L 29/06* (2006.01)

(52) U.S. Cl.
CPC ........ *H04L 63/0869* (2013.01); *H04L 63/083* (2013.01); *H04L 63/0876* (2013.01)

(58) Field of Classification Search
CPC ............... H04L 63/0869; H04L 63/083; H04L 63/0876
See application file for complete search history.

(56) References Cited

U.S. PATENT DOCUMENTS

| 2006/0064588 | A1* | 3/2006 | Tidwell | G06F 21/316 713/169 |
|---|---|---|---|---|
| 2008/0189547 | A1* | 8/2008 | Sugiyama | G06F 21/445 713/169 |
| 2013/0086670 | A1* | 4/2013 | Vangpat | H04L 9/3213 726/8 |
| 2013/0347129 | A1* | 12/2013 | Samuelsson | H04L 9/321 726/28 |
| 2015/0032627 | A1* | 1/2015 | Dill | G06Q 20/385 705/44 |

* cited by examiner

*Primary Examiner* — Joseph P Hirl
*Assistant Examiner* — Hassan Saadoun
(74) *Attorney, Agent, or Firm* — Quarles & Brady LLP

(57) ABSTRACT

A hosting provider may be bi-directionally authenticated with one or more media repositories. The hosting provider preferably has domain name registration and hosting capabilities. The media repositories may collect data (such as pictures and/or files) from one or more users. Once authenticated, the hosting provider and media repositories may cooperate in storing, aggregating and transmitting data to a user. Routes may be hosted by the hosting provider and used to organize and access the data. For example, a user may enter a route into a browser and receive media/data, possibly from a plurality of media repositories, that is associated with that route. In another example, the user may enter a route into the browser and be redirected from the hosting provider to a website of the media repository.

20 Claims, 11 Drawing Sheets

BI-DIRECTIONAL AUTHENTICATION BETWEEN A MEDIA REPOSITORY AND A HOSTING PROVIDER

FIELD OF THE INVENTION

A method is presented that allows a user to securely and easily access related data (perhaps commonly tagged) across a plurality of different media repositories in partnership with a hosting provider. A root and a plurality of related routes may be hosted by the hosting provider and the routes may either redirect the user to a website of a media repository and/or allow access to data collected by a media repository.

SUMMARY OF THE INVENTION

A hosting provider may authenticate, and be authenticated by, one or more media repositories. Once both are authenticated by the other, the media repositories may share data with the hosting provider at the request of a user. The hosting provider may then aggregate the data from one or more media repositories in response to a request from the user.

A media repository may comprise a website and collect data from one or more users. As non-limiting examples, the data may be one or more texts, pictures, data files, audio files, video files, uniform resource locators (URLs), routes and/or any combination thereof. As specific non-limiting examples, the media repository may be Dropbox™, Facebook™, Microsoft OneDrive®, Google Drive, Instagram™ or Apple Photostream.

The hosting provider may receive and authenticate a hosting provider login credentials from a user on a client device. The process is only continued if the hosting provider authenticates the hosting provider login credentials of the user. This confirms that the user is the customer of the hosting provider as claimed by the user. The hosting provider may redirect the client device of the user to a website of a media repository. The media repository may receive the redirected user on the client device from the hosting provider. The media repository may authenticate a media repository login credentials of the user on the client device. If authenticated, this confirms that the user is the customer of the media repository as claimed by the user.

The process is only continued if the media repository authenticates the media repository login credentials of the user. The media repository may generate a media repository token. The media repository may associate the media repository token with a media repository account of the user. The media repository may then transmit the media repository token to the hosting provider.

The hosting provider may receive the media repository token generated by the media repository and the hosting provider may generate a hosting provider token. The hosting provider may associate the hosting provider token with a hosting provider account of the user. The hosting provider may then transmit the hosting provider token to the media repository. At this point, the hosting provider and/or the media repository may transfer the other party's token along with data to the other party. The other party may confirm that the token received is the same token that the party generated. If the received token matches the stored generated token, the party knows the data transfer request or instruction should be accepted and is authorized by the user.

The hosting provider may receive from the media repository the hosting provider token and a first instruction to manage the hosting provider account of the user. The first instruction is only processed if the hosting provider received the hosting provider token. The hosting provider may then manage the hosting provider account of the user according to the first instruction if the hosting provider token is verified as being correct, i.e., the received token matches the stored generated token.

The hosting provider may transmit to the media repository the media repository token and a second instruction to manage the media repository account of the user. The second instruction is only processed if the media repository received the media repository token. The media repository may then manage the media repository account of the user according to the second instruction if the media repository token is verified as being correct.

In an example embodiment of a media repository transmitting data originating from a user to a hosting provider, the hosting provider may register a domain name to a user. The hosting provider may host a root for the user. The root may comprise a third level domain combined with the domain name registered to the user.

The hosting provider may store the root in a nameserver that is part of a domain name system.

The hosting provider may receive a plurality of routes from the media repository. Each route in the plurality of routes may comprise the root (which itself comprises a third level domain and the domain name registered to the user). The hosting provider may store the plurality of routes with the hosted root using a route managed hosting.

In an example embodiment, the user may be redirected from the hosting provider to a website of the media repository. The hosting provider may receive a route in the plurality of routes that is a first uniform resource locator from a browser running on a client device. The first uniform resource locator may be associated with a second uniform resource locator. The hosting provider may redirect the browser on the client device to the second uniform resource locator.

In another example embodiment, the hosting provider may transmit aggregated data to the user. The hosting provider may receive a first route from a first media repository. The first route may comprise the root and the first route may point to a first data. The hosting provider may store the first route from the first media repository with the hosted root in the managed route hosting.

The hosting provider may receive a second route from a second media repository. The second route may also comprise the root and the second route may point to a second data. The first route and the second route may comprise (in addition to the third level domain and the domain name registered to the user) the same tag. The tag may be a word or phrase placed in the file name position of the route or URL to help organize and/or categorize the media. In the route pictures.johndoe.com/graduation, the graduation may be a tag to help aggregate pictures that are related to the tag graduation. The hosting provider may store the second route from the second media repository with the hosted root.

The hosting provider may receive the tag (possibly as part of a URL) from a browser running on a client device. The hosting provider may transmit the first data and the second data to the browser running on the client device. In this embodiment, a user may be shown media (such as pictures and/or video) on a single webpage from two or more media repositories that have been similarly tagged. This would allow, as an example, the user to receive pictures from two or more media repositories related to the same event, such as a graduation.

The above features and advantages of the present invention will be better understood from the following detailed description taken in conjunction with the accompanying drawings.

DETAILED DESCRIPTION

Figure 1:
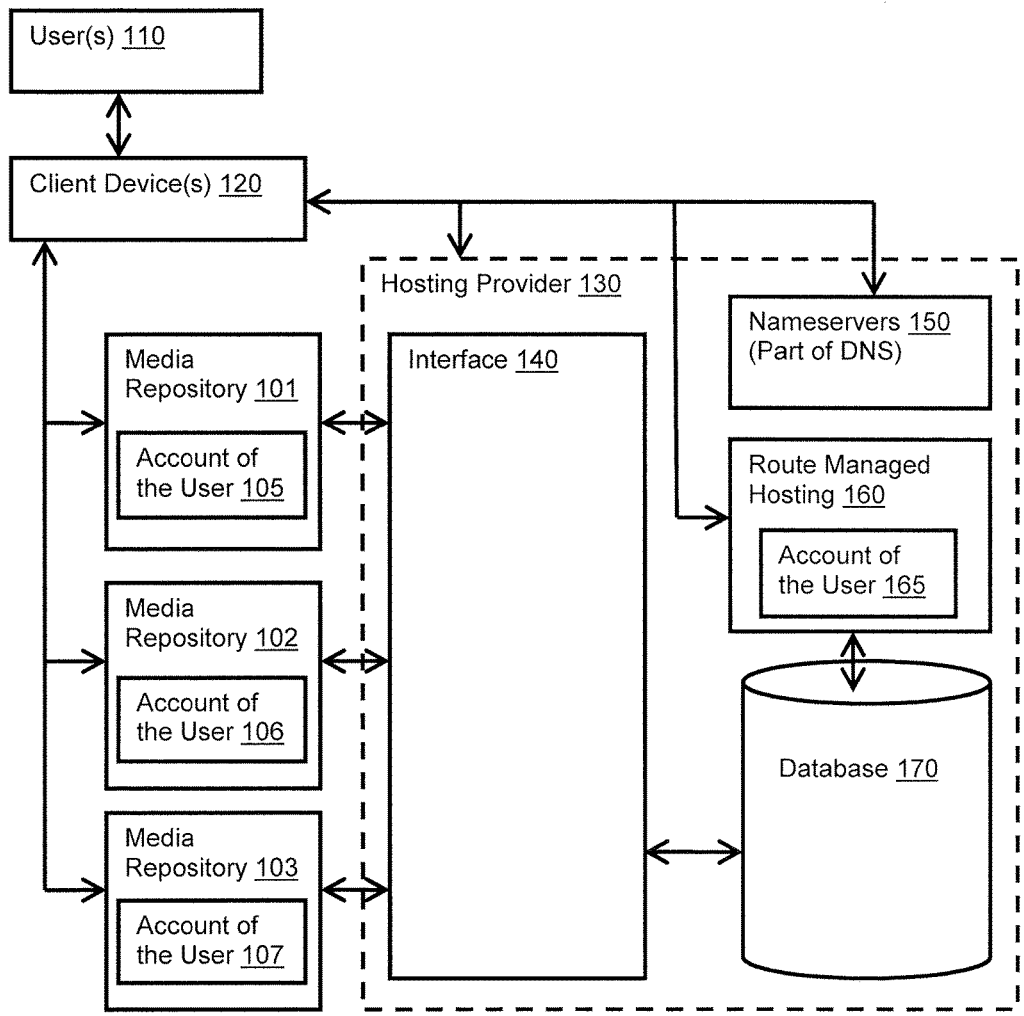
FIG. 1 is a block diagram of a system allowing a bi-directionally authentication of a media repository and a hosting provider, media repositories transmitting data to a hosting provider, a hosting provider redirecting a user to a website of a media repository and a hosting provider aggregating data from media repositories.
Figure 2:
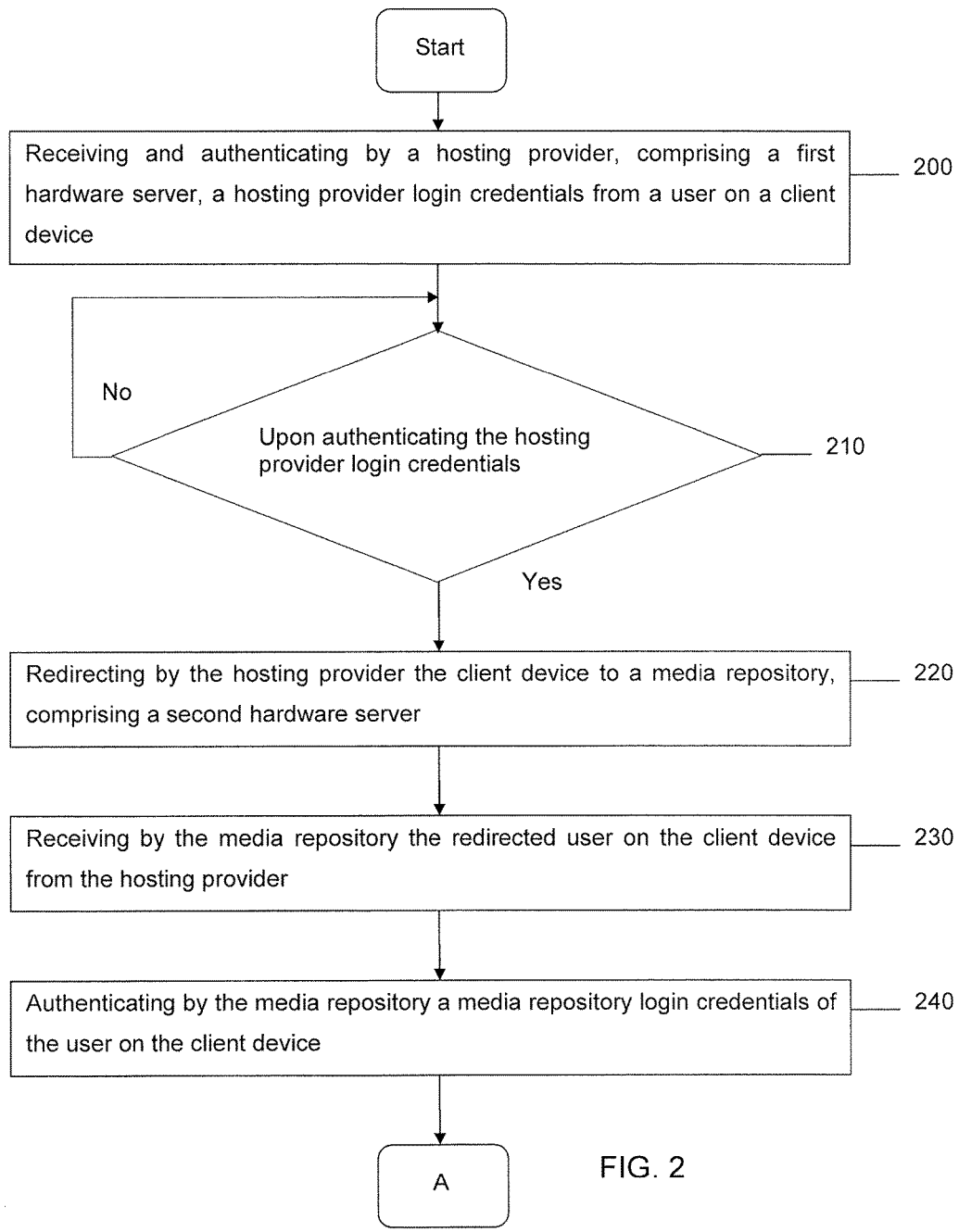
FIGS. 2-5 are flowcharts illustrating a method for bi-directionally authenticating a media repository and a hosting provider.
Figure 3:
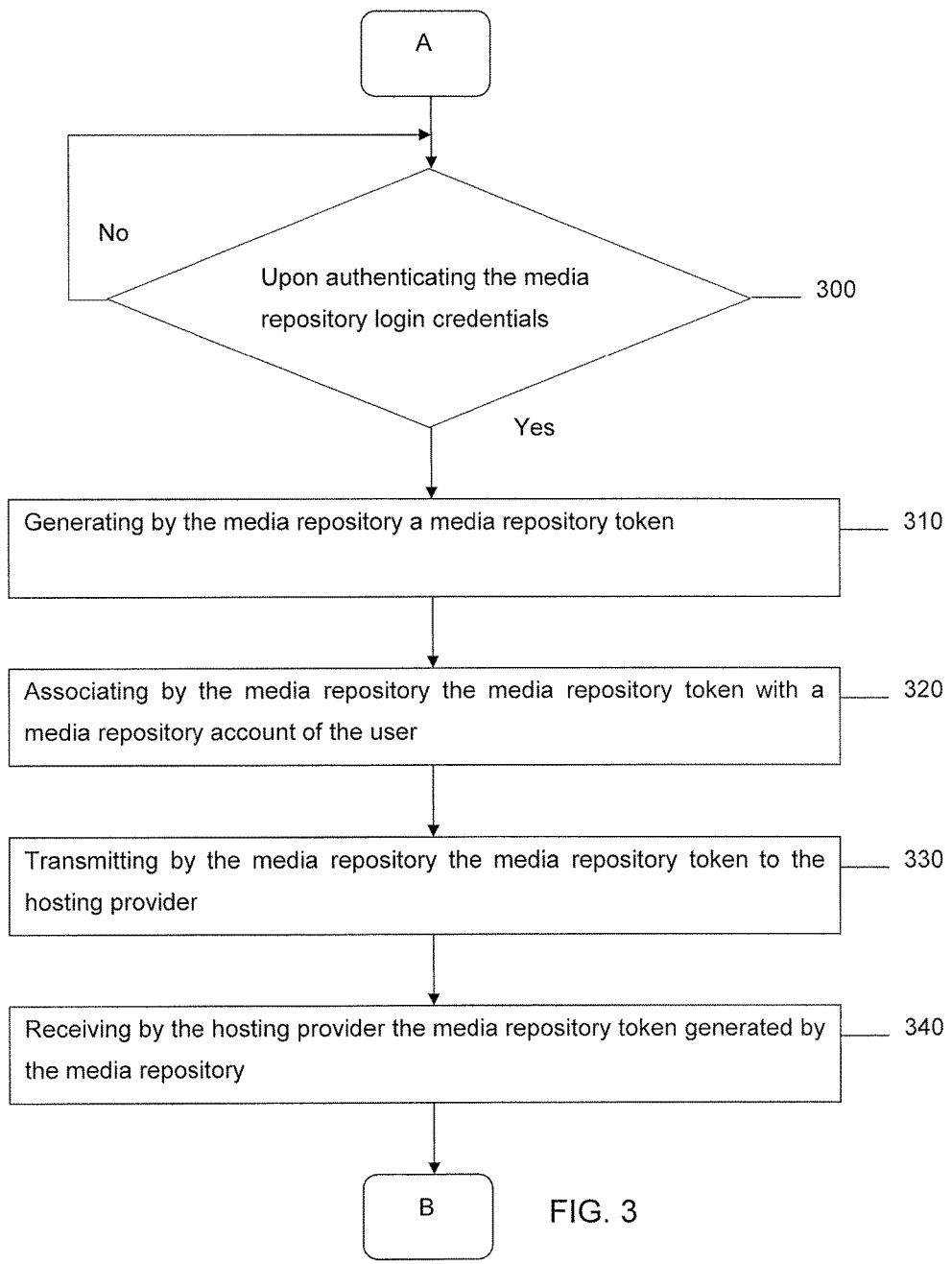
Figure 4:
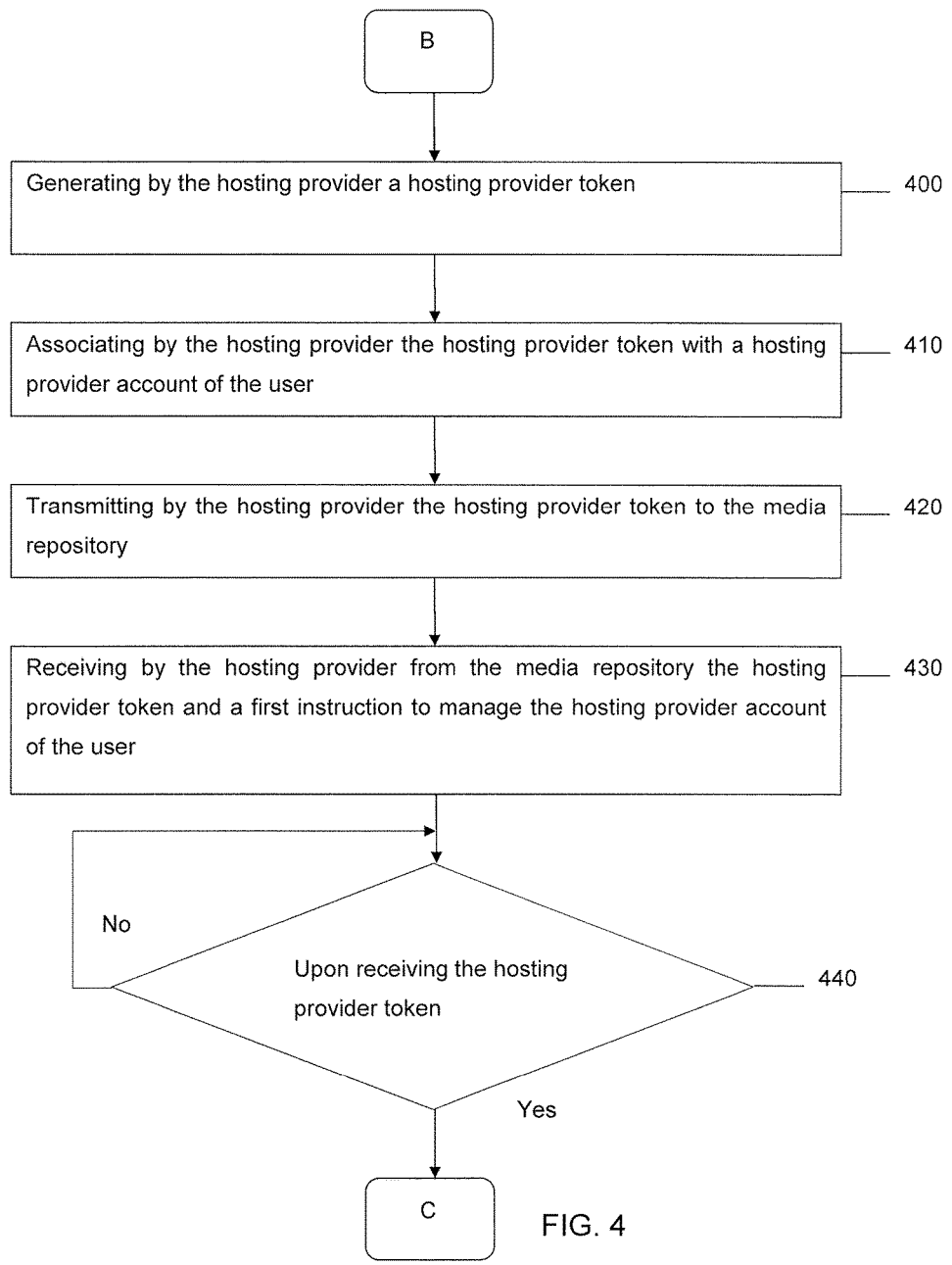
Figure 5:
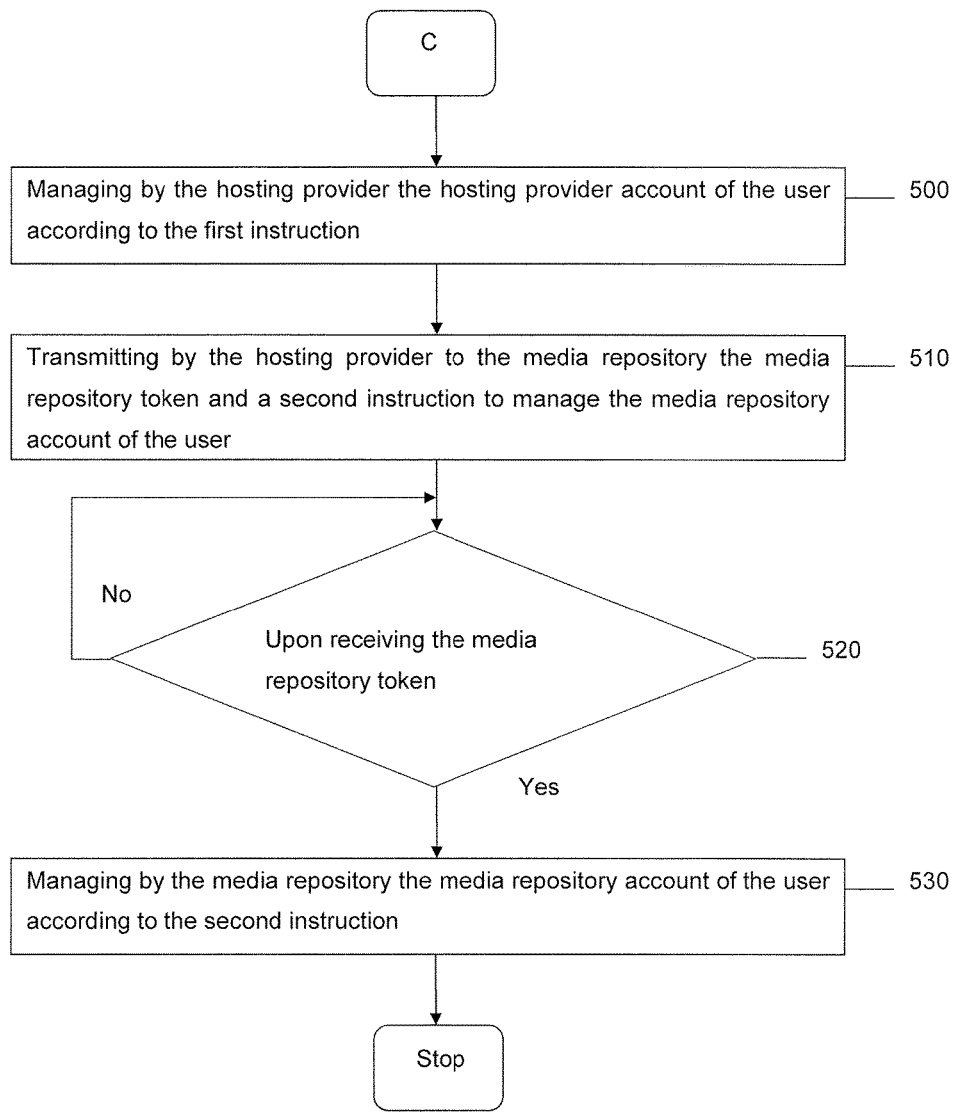
Figure 6:
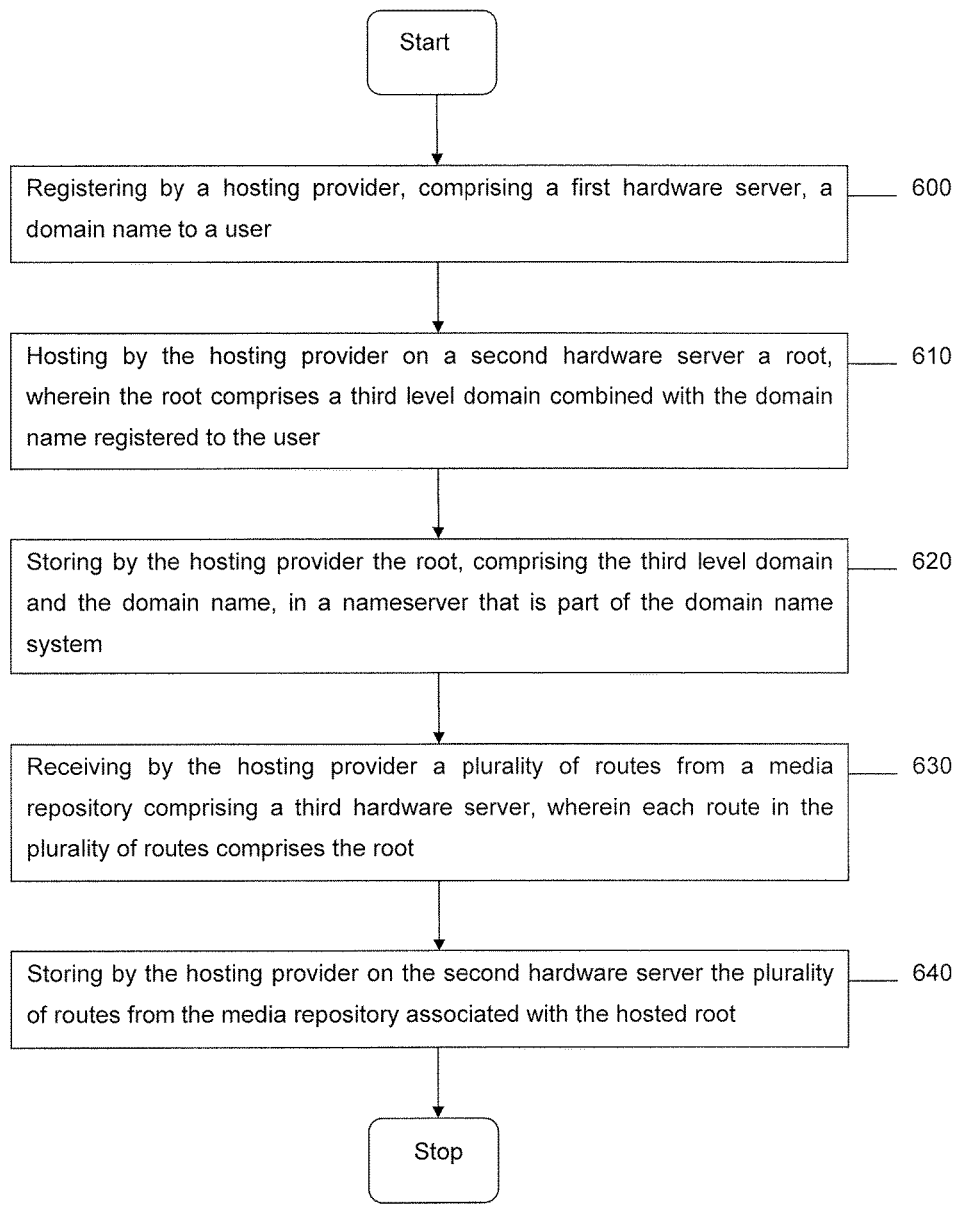
FIG. 6 is a flowchart illustrating a method for a media repository to transmit one or more routes to a hosting provider.
Figure 7:
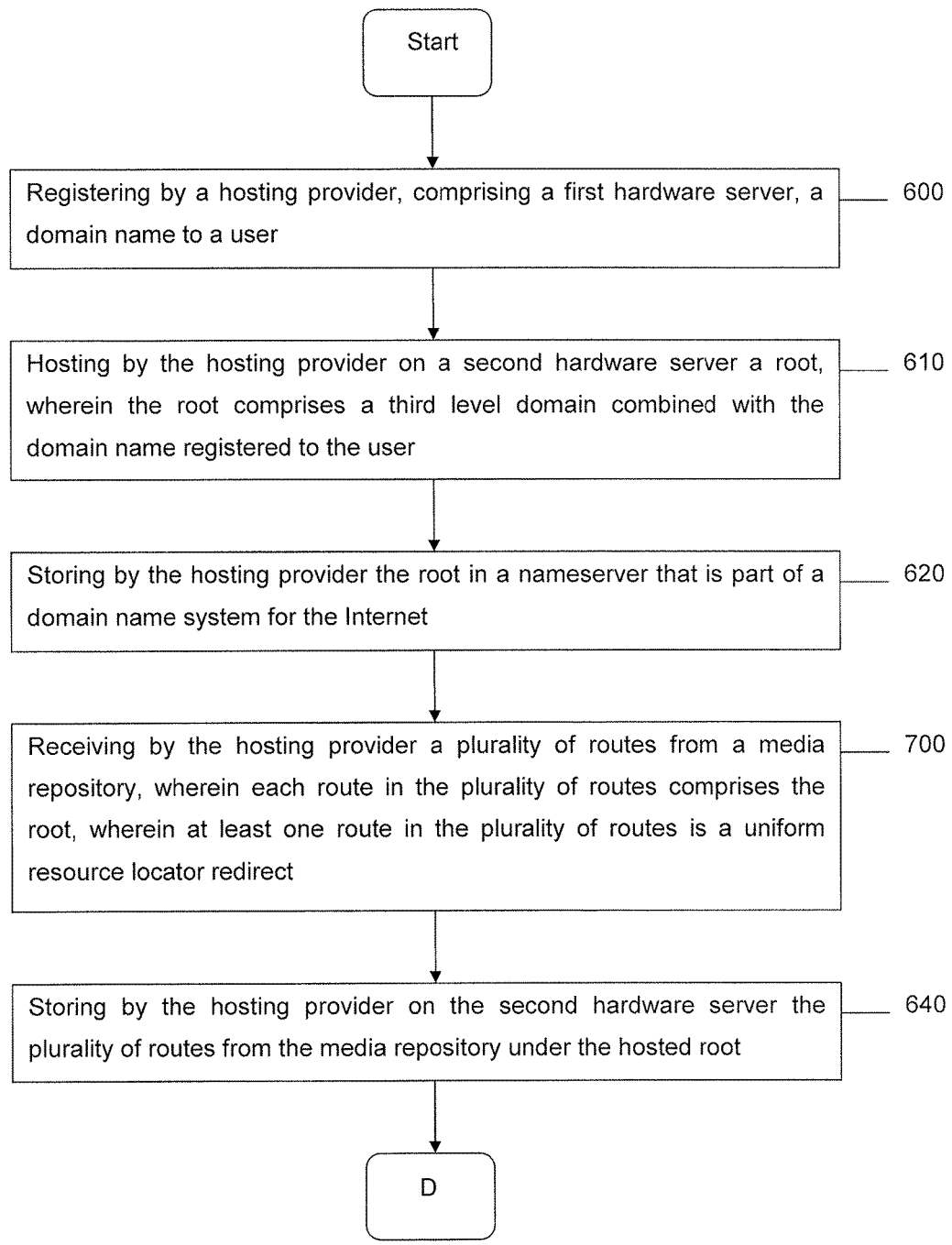
FIGS. 7-8 are flowcharts illustrating a method for a media repository to transmit one or more routes to a hosting provider, wherein the routes may be computer addresses (such as IP addresses and/or URL redirects) to redirect a user to a website of the media repository.
Figure 8:
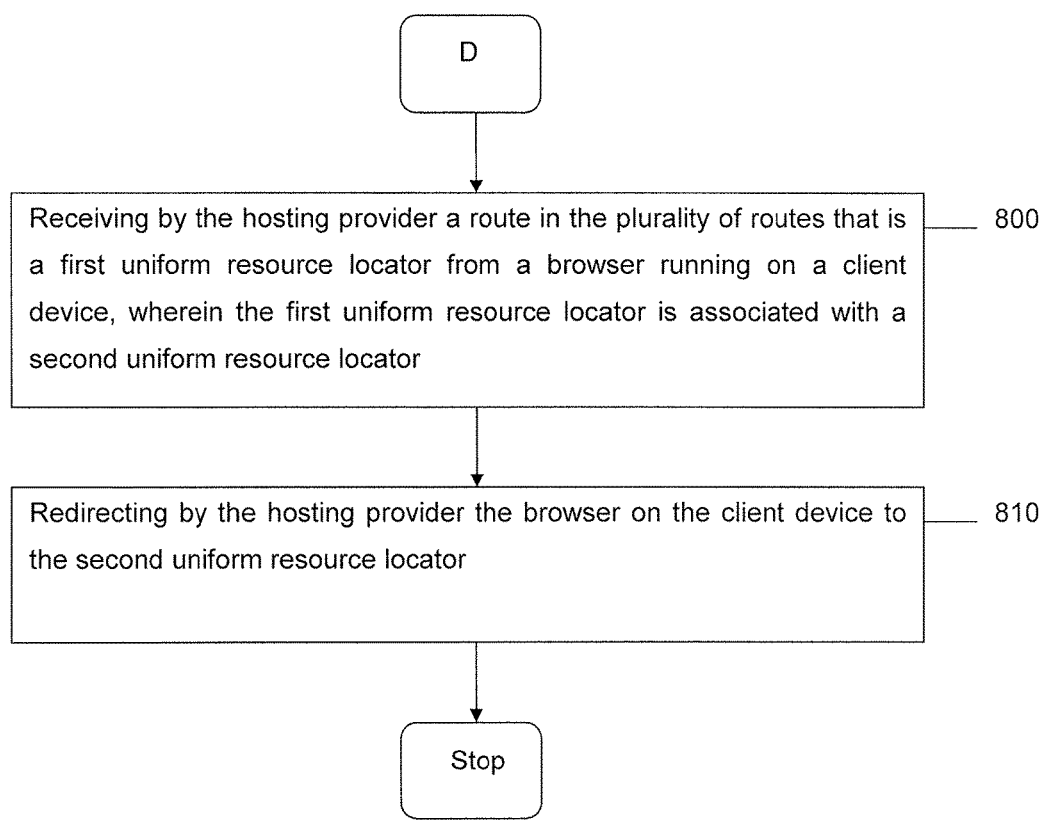
Figure 9:
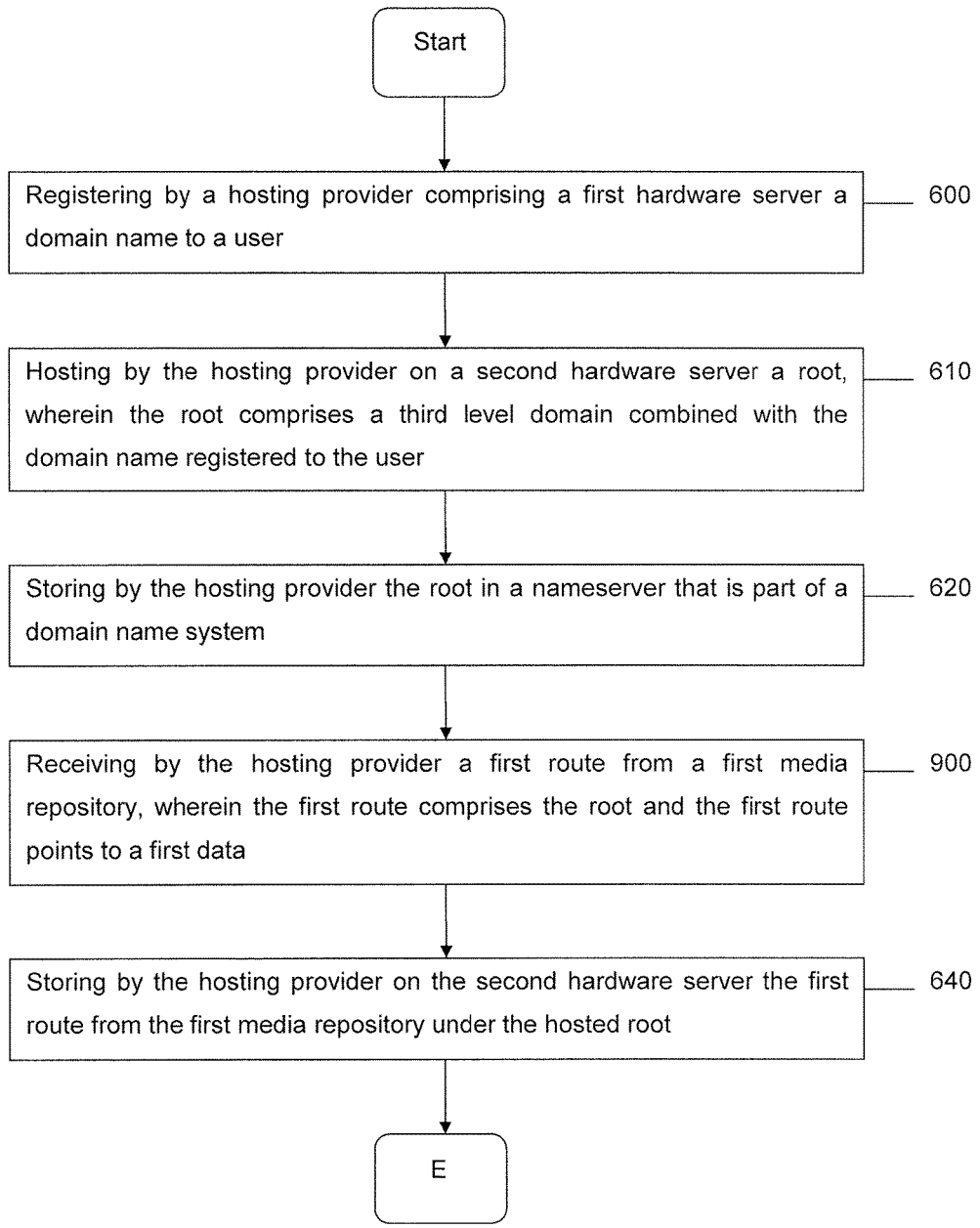
FIGS. 9-10 are flowcharts illustrating a method for a hosting provider to aggregate data, which may be similarly tagged, from one or more media repositories to thereby allow a user to access related data from a single point (the hosting provider) that originated in the one or more media repositories.
Figure 10:
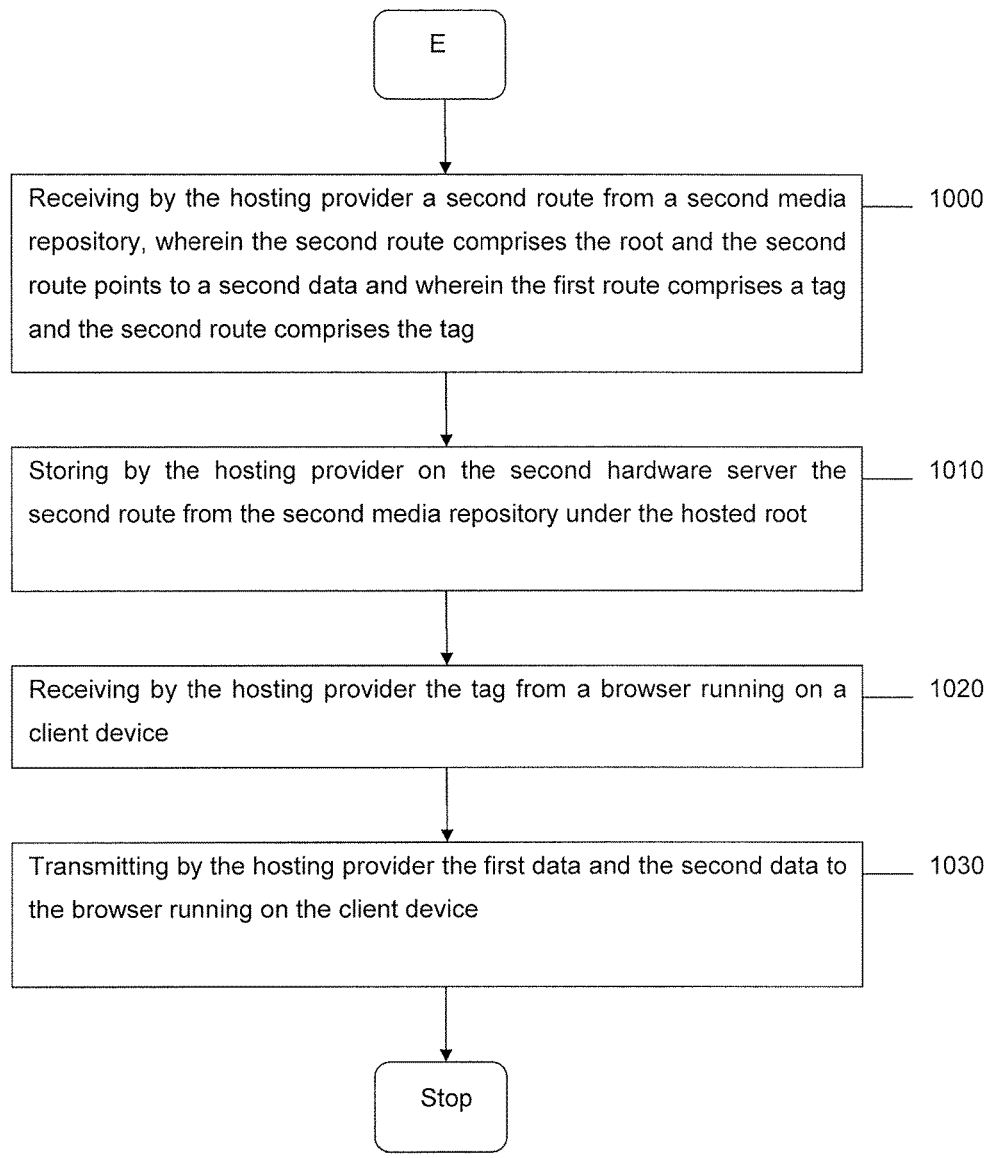

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to bi-directionally authenticate a media repository 101-103 and a hosting provider 130. Once authenticated, the media repository 101-103 and the hosting provider 130 may share data and/or send instructions to one another. As a specific example, once authenticated, a plurality of media repositories 101-103, such as, as non-limiting examples, Dropbox, Facebook, Microsoft OneDrive, Google Drive, Instagram or Apple Photostream may transmit media (such as text, pictures, video, files, etc.) to the hosting provider 130, thereby allowing the hosting provider 130 to aggregate the media so that the hosting provider 130 may display the media to the user 110 on a single webpage from a plurality of media repositories 101-103.

The illustrated system may also allow the media repository 101-103 to transmit data to a database 170 operated by the hosting provider 130. The system may also allow the hosting provider 130 to redirect a user 110 to a website of the media repository 101-103. The system may also allow the hosting provider 130 to aggregate data from a plurality of media repositories 101-103 before presenting the data to the user 110 or other users permitted by the user 110.

The arrows between the client device 120, media repositories 101-103, hosting provider 130, interface 140, nameservers 150, route managed hosting 160 and database 170 represent one or more computer networks. Communications and transmissions may use any currently known or developed in the future methods or protocols.

A computer network is a collection of links and nodes (e.g., multiple computers and/or other devices connected together) arranged so that information may be passed from one part of the computer network to another over multiple links and through various nodes. Non-limiting examples of computer networks include the Internet, a public switched telephone network, a global Telex network, an intranet, an extranet, a local-area network, a wide-area network, wired networks, wireless networks and/or cell phone networks.

The Internet is a worldwide network of hardware servers and computer networks arranged to allow for the easy and robust exchange of information between, for example, a user 110 on a client device 120 and one or more websites hosted on one or more hardware servers.

A hardware server is hereby defined to be a physical machine. While a hardware server provides the hardware to run software, the hardware server is hereby defined to be not merely or only software. Hardware servers may be, as a non-limiting example, one or more Dell PowerEdge(s) rack server(s), HP Blade Servers, IBM Rack or Tower servers, although other types of hardware servers and/or combinations of other hardware servers may also be used.

Hundreds of millions of people (users) around the world have access to client devices 120 connected to the Internet. A user 110 may use a client device 120, such as, as non-limiting examples, a cell phone, PDA, tablet, laptop computer or desktop computer to access a website or a hardware server via the Internet. Users are able to access data at specific locations on the Internet referred to as websites.

Websites may consist of a single webpage, but typically consist of multiple interconnected and related webpages. Websites, unless very large and complex or have unusual traffic demands, often reside on a single hardware server and are prepared and maintained by a single individual or entity (although websites residing on multiple hardware servers are also becoming increasingly common). Hosting providers may provide the hardware and infrastructure necessary to host a plurality of websites for a plurality of website operators.

Menus, links, tabs, etc. may be used to move between different web pages within a website or to move to a different webpage on a different website. Websites may also use URL redirects to move a user 110 from one webpage on one website to another webpage, possibly on a different website. The combination of all the websites and their corresponding web pages on the Internet is generally known as the World Wide Web (WWW) or simply the Web.

Websites may be created using HyperText Markup Language (HTML) to generate a standard set of tags that define how the webpages for the website are to be displayed. Users 110 may access websites using software known as an Internet browser, such as MICROSOFT INTERNET EXPLORER™, GOOGLE CHROME or MOZILLA FIREFOX™. After the browser has located the desired webpage, the browser requests and receives information from the webpage, typically in the form of an HTML document, and then displays the webpage content for the user 110 on the user's client device 120. The user 110 then may view other webpages at the same website or move to an entirely different website using the browser.

Browsers are able to locate specific websites because each website has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

However, IP addresses, even in human readable notation, are difficult for users to remember and use. A Uniform Resource Locator (URL) is easier to remember and may be an address to a resource (such as a file comprising data) on the Internet. A browser may be able to access the file (and its data) on the Internet through the use of a URL. A URL may include a protocol identifier (such as a Hypertext Transfer Protocol request), a domain name and a path to a file or resource. As a non-limiting example of a URL with an HTTP request, domain name and file name is: http://www.content.johndoe.com/birthdayparty. In this example, "http" identifies the URL as a HTTP request, "content" is the third level domain, "johndoe.com" is the domain name and "birthdayparty" is the file name or the tag.

A URL may also be a URL redirect which, when received by a browser, redirects the browser to a different URL which may be translated into an address to another resource (such as a website, file or data). A URL may also be parsed into a route that may be used to find a resource.

Domain names are also much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry to be an authoritative source of information (the particular data stored by the registry varies depending on the TLD). One or more domain name registrars may register domain names to users 110 (domain name registrants) on behalf of a registry.

The process for registering a domain name with .com, .net, .org, and some other TLDs allows a user 110 to use an ICANN-accredited domain name registrar to register a domain name. For example, if a user 110, John Doe, wishes to register the domain name "johndoe.com," John Doe may initially determine whether the desired domain name is available by contacting a domain name registrar. The potential domain name registrant may make this contact using the registrar's webpage and typing the desired domain name into a field on the registrar's webpage created for this purpose.

Upon receiving a domain name or a domain name search request from the user 110, the registrar may ascertain whether "johndoe.com" has already been registered by, as non-limiting examples, checking the SRS database associated with the TLD of the domain name or by checking with the registry responsible for the TLD. The results of the search may be displayed on the webpage to notify the user 110 of the availability of the desired domain name. If the desired domain name is available, the user 110 may proceed with the domain name registration process. If the desired domain name is not available for registration, the registrar may transmit one or more suggested domain names to the user 110 to permit the user 110 to select and register one or more of the suggested domain names.

Once a domain name is registered to a user 110, the user 110 may desire to have the domain name point to a resource on the Internet. The Domain Name System (DNS) is a hierarchical distributed naming system for computers, services or any other resource connected to the Internet or a private network. The DNS is an Internet service that translates domain names into IP addresses. As an example, the DNS may translate the domain name johndoe.com into the IP address of 111.222.1212.123.

The DNS comprises a plurality of nameservers 150. Each nameserver 150 is hereby defined to comprise a hardware server that is connected to the Internet and translates domain names into IP address in response to queries from browsers. Domain name registrars (registrars) and website hosting providers may maintain and control one or more nameservers 150. The registrars and hosting providers allow their customers (users 110) to store their domain names and associated IP addresses in one or more nameservers 150. In this manner, a domain name (such as johndoe.com) registered to a user 110 may be translated by a nameserver 150 (that is part of the DNS) into an IP address. The IP address may point to a resource, such as a website owned and operated by the registrant (user 110) of the domain name. The browser may receive from the nameserver 150 the IP address and then use the IP address to locate the resource associated with the IP address.

Users 110 may also visit and create an account 105-107 with each of one or more media repositories 101-103. Users 110 may be able to store media (such as text, pictures, videos, files, etc.) at one or more media repositories 101-103. For purposes of this specification, a media repository 101-103 comprises at least one hardware server and is hereby defined to be a machine. Login credentials may be required to access each of the user's account 105-107 with each of the one or more media repositories 101-103. Login credentials may be, as non-limiting examples, a username, a password, biometric authentication, three-way authentication or any other method of authenticating the user 110.

Each media repository 101-103 may also comprise a website (operated on the at least one hardware server) and collect data or media from the user 110. As non-limiting examples, the data/media may be text, picture(s), file(s), audio, video, uniform resource locator(s) (URLs), route(s) and/or any other form of data. As non-limiting examples, a media repository 101-103 may be Dropbox, Facebook, Microsoft OneDrive, Google Drive, Instagram or Apple Photostream.

A hosting provider 130 may provide the ability for a user 110 to access data stored by one or more media repositories 101-103. For purposes of this specification, the hosting provider 130 comprises at least one hardware server and is hereby defined to be a machine. The hosting provider 130 preferably comprises an interface 140, one or more nameservers 150 (that are part of the DNS), route managed hosting 160 and a database 170.

The interface 140 may receive by any desired means, such as, as a non-limiting example, an Application Program Interface (API), routes and data from one or more media repositories 101-103 for one or more users. The interface 140 comprises one or more hardware servers and is hereby defined to be a machine. The interface 140 may store the collected routes and data in the database 170.

A route preferably comprises a URL and optionally, one or more file names or tags. As an example, the interface 140 may receive the route content.johndoe.com/birthdayparty and store one or more pictures the user 110 associated with the route content.johndoe.com/birthdayparty in the database 170.

A user 110 may obtain an account 165 from the hosting provider 130 or the route managed hosting 160. Login credentials may be required to access the account 165 of the user 110 with the hosting provider 130. The route managed hosting 160 may host and store a root, comprising a domain name and possibly a third or higher domain, and one or more routes comprising the root and possibly a tag. The route managed hosting 160 comprises at least one hardware server and is hereby defined to be a machine.

Bi-Directional Authentication

A hosting provider 130 may authenticate, and be authenticated by, one or more media repositories 101-103. Once the hosting provider 130 is bi-directionally authenticated with one or more media repositories 101-103, the media repositories 101-103 may share data with the hosting provider 130 at the request of a user 110. The hosting provider 130 may then aggregate the data from one or more media repositories 101-103 in response to a request from the user 110. This allows the hosting provider 130 to display on a single webpage media and/or data from a plurality of the media repositories 101-103.

An example method of bi-directionally authenticating the user 110 with at least one media repository 101-103 and a hosting provider 130 will now be described. With reference to FIGS. 2-5, the hosting provider 130 may receive and authenticate on a hosting provider website hosting provider login credentials from a user 110 on a client device 120. (Step 200) As an example, the login credentials may be a user name, such as John Doe, and a password, although any type of login credentials may be used. After successfully logging in to the hosting provider website (Step 210), the hosting provider website may provide an option for the user 110 to select bi-direction authentication with one or more media repositories 101-103. The user 110 may select bi-directional authentication and select at least one media repository 101-103.

The hosting provider 130 may redirect or link the client device 120 to a website of a media repository 101-103. (Step 220) The website of the media repository 101-103 may receive the redirected user 110 on the client device 120 from the hosting provider 130. (Step 230) The media repository 101-103 may authenticate media repository 101-103 login credentials of the user 110. (Step 240) It should be noted that if the user 110 was not able to provide authenticated login credentials to the hosting provider 130 and/or was not able to provide authenticated login credentials to the media repository 101-103, bi-directional authentication will not be possible. Only if the user 110 was able to provide authenticated login credentials to the hosting provider 130 and was able to provide authenticated login credentials to the media repository 101-103, is bi-directional authentication possible. (Step 300)

The media repository 101-103 may generate a media repository token. (Step 310) The media repository token is preferably a string of numbers and/or characters. The media repository token is preferably unique in the sense that no other users of the media repository 101-103 are provided the same media repository token. The media repository 101-103 may associate the media repository token with a media repository account 105-107 of the user 110. (Step 320) The media repository 101-103 may transmit the media repository token to the hosting provider 130. (Step 330) The hosting provider 130 may receive the media repository token generated by the media repository 101-103. (Step 340) The hosting provider 130 may then use the media repository token when sending data and/or instructions to the media repository 101-103 so that the media repository 101-103 is aware that the data and/or instructions is authorized by the user 110.

The hosting provider 130 may generate a hosting provider token. (Step 400) The hosting provider token is also preferably a string of numbers and/or characters. The hosting provider token is preferably unique in the sense that no other users of the hosting provider 130 are provided the same hosting provider token. The hosting provider 130 may associate the hosting provider token with a hosting provider account 165 of the user 110. (Step 410) The hosting provider 130 may transmit the hosting provider token to the media repository 101-103. (Step 420)

The hosting provider 130 may receive from the media repository 101-103 the hosting provider token and a first instruction to manage the hosting provider account 165 of the user 110. (Step 430) It should be appreciated that any data and/or instructions received without the hosting provider token is preferably ignored and not acted upon. Only if the hosting provider token associated with the user hosting provider account 165 is received are the data and/or instructions acted upon by the hosting provider 130. (Step 440) Upon receiving the hosting provider token, the hosting provider 130 may manage the hosting provider account 165 of the user 110 according to the first instruction. (Step 500)

The hosting provider 130 may transmit to the media repository 101-103 the media repository token and a second instruction to manage the media repository account 105-107 of the user 110. (Step 510) It should be appreciated that any data and/or instructions received without the media repository token is preferably ignored and not acted upon. Only if the media repository token associated with the user account 105-107 is received are the data and/or instructions acted upon by the media repository 101-103. (Step 520) Upon receiving the media repository token, the media repository 101-103 may manage the media repository account 105-107 of the user 110 according to the second instruction. (Step 530)

Media Repository Transmitting Data to a Hosting Provider

In another embodiment, a hosting provider 130 may register a domain name to a user 110. (Step 600) As a non-limiting example, the hosting provider 130 may register the domain name johndoe.com to the user 110 so that the user 110 is the registrant of the domain name johndoe.com.

The hosting provider 130 may host a root for the user 110, wherein the root comprises a third level domain combined with the domain name registered to the user 110. (Step 610) As a non-limiting example, content.johndoe.com may be a root for the domain name johndoe.com. Thus, the hosting provider 130 may host the root content.johndoe.com on a hosting server.

In some embodiments, the root may also comprise a fourth domain and/or one or more higher domains. As a non-limiting example, the root may be pictures.content.johndoe.com, which has pictures as a fourth level domain.

In some embodiments, the root may also comprise one or more file names. As a non-limiting example, the root may be content.johndoe.com/birthdayparty, which has birthdayparty as a file name. In some embodiments, the root may have a fourth domain and or one or more higher domains and one or more file names. As a non-limiting example, the root may be pictures.content.johndoe.com/birthdayparty.

The hosting provider 130 may store the root in a nameserver 150 that is part of a domain name system (DNS). (Step 620) The hosting provider 130 may assign an IP address to the root and store the root and its associated IP address in one or more nameservers 150. Storing the root and its associated IP address in one or more nameservers 150 allows a user 110 to enter a URL that comprises the root in a browser on a client device 120 and thereby have the browser access the root hosted by the hosting provider 130.

The hosting provider 130 may receive from time to time one or more routes from one or more media repositories 101-103. The media repositories 101-103 may transmit one or more routes and/or one or more media, as non-limiting examples, after a set period of time, such as once every 24 hours, after new media has been added by the user 110 to the media repository 101-103 and/or after requested by the hosting provider 130 (possibly triggered by a request from the user 110).

Each route in the one or more routes preferably comprises a root. (Step 630) As a non-limiting example, the hosting provider 130 may receive from a media repository 101-103 the routes contents.johndoe.com/pictures/2016/newyears and contents.johndoe.com/pictures/2016/valentines and from a second media repository 101-103 the routes of contents.johndoe.com/pictures/2016/newyears and contents.johndoe.com/pictures/2016/halloween. The hosting provider 130 also preferably receives data, such as text, pictures, files, audio, video, URL redirects, routes, and/or any other form of data associated with each route.

In another embodiment, the hosting provider 130 may store the one or more routes from the one or more media repositories 101-103 with the hosted root as part of a route managed hosting 160. The route managed hosting 160 may host one or more roots and associated routes for one or more users. (Step 640) The data associated with each route may be stored in a database 170 or with a media repository 101-103.

In another embodiment, the hosting provider 130 may assign one or more routes an IP address and then store each route and its associated IP address in a nameserver 150 that is part of the domain name system (DNS). The route may comprise a third level domain, possibly in combination with higher level domains, and/or a file name or file extension.

The hosting provider 130 may receive the data from the media repositories 101-103 by any desired communication method or methods. As a non-limiting example, the hosting provider 130 via an interface 140 may request and thereafter receive data associated with one or more routes from one or more media repositories 101-103. As another non-limiting example, one or more media repositories 101-103 may transmit data, without being requested, to the hosting provider 130 via the interface 140. As another non-limiting example, one or more media repositories 101-103 may use an API interface to communicate the data to the interface 140 of the hosting provider 130. The received data may then be stored in a database 170.

A Hosting Provider Redirecting a User to a Media Repository

In another embodiment, the hosting provider 130 may receive a route that is a first uniform resource locator from a browser running on a client device 120. The first uniform resource locator may be associated with a second uniform resource locator. (Step 800) The hosting provider 130 may redirect the browser on the client device 120 to the second uniform resource locator. (Step 810) The second uniform resource locator may point to, as a non-limiting example, a website of the media repository 101-103 that transmitted the route to the hosting provider 130. In this manner the user 110 running the browser on the client device 120 may be redirected from the route managed hosting 160 of the hosting provider 130 to the website of the media repository 101-103 that provided the route.

As a non-limiting example, the user 110 may enter the first route content.johndoe.com/birthdayparty into a browser. The hosting provider 130 may receive the first route content.johndoe.com/birthdayparty and see that the first route is associated with a second route birthdayparty.johndoe.com.serviceprovider.com. The hosting provider 130 may redirect the browser to the second route which may be, as a non-limiting example, a website of a media repository 101-103.

A Hosting Provider Aggregating Data from Media Repositories

In another embodiment, a hosting provider 130 may receive a first route from a first media repository 101-103. The media repository 101-103 may transmit one or more routes, as non-limiting examples, after a set period of time (push technology), after new media has been added by the user 110 to the media repository 101-103 (push technology) and/or after requested by the hosting provider 130, possibly triggered by a request from the user 110, (pull technology).

The first route may comprise a root and the first route may point to a first data. (Step 900) The hosting provider 130 may store the first route from the first media repository 101-103 with the hosted root on a route managed hosting 160. (Step 640) As a non-limiting example, the first route may be firstservicename.content.johndoe.com/anniversary the route may point to the first data which may be one or more pictures the user 110 desires to associate with the first route.

The hosting provider 130 may receive a second route from a second media repository 101-103. The second route may comprise the root and the second route may point to a second data. (Step 1000) The hosting provider 130 may store the second route from the second media repository 101-103 with the hosted root on the route managed hosting 160. In this embodiment, the first route may comprise a tag and the second route may comprise the tag, i.e., the first route and the second route may have the same tag. (Step 1010) As a non-limiting example, the second route may be secondservicename.content.johndoe.com/anniversary. In this example, the first route and the second route have the same tag of anniversary. In this manner data that is related (such as pictures and video) to the same event (here identified as anniversary) may be tagged with the same tag of anniversary. In some embodiments, the tag may have a plurality of levels that may act as a directory, to organize data into a structure, such as a directory or tree structure. As a non-limiting example, a tag may be 2016/anniversary/restaurant/pictures and used with other tags to organize the media and/or data.

The hosting provider 130 may receive the tag from a browser running on a client device 120. (Step 1020) The hosting provider 130 may transmit the first data and the second data to the browser running on the client device 120. (Step 1030) As a non-limiting example, a request from a browser with a tag of 2016/anniversary may be responded to with data from all routes that have 2016/anniversary as part of their route or as part of their tag.

Figure 11:
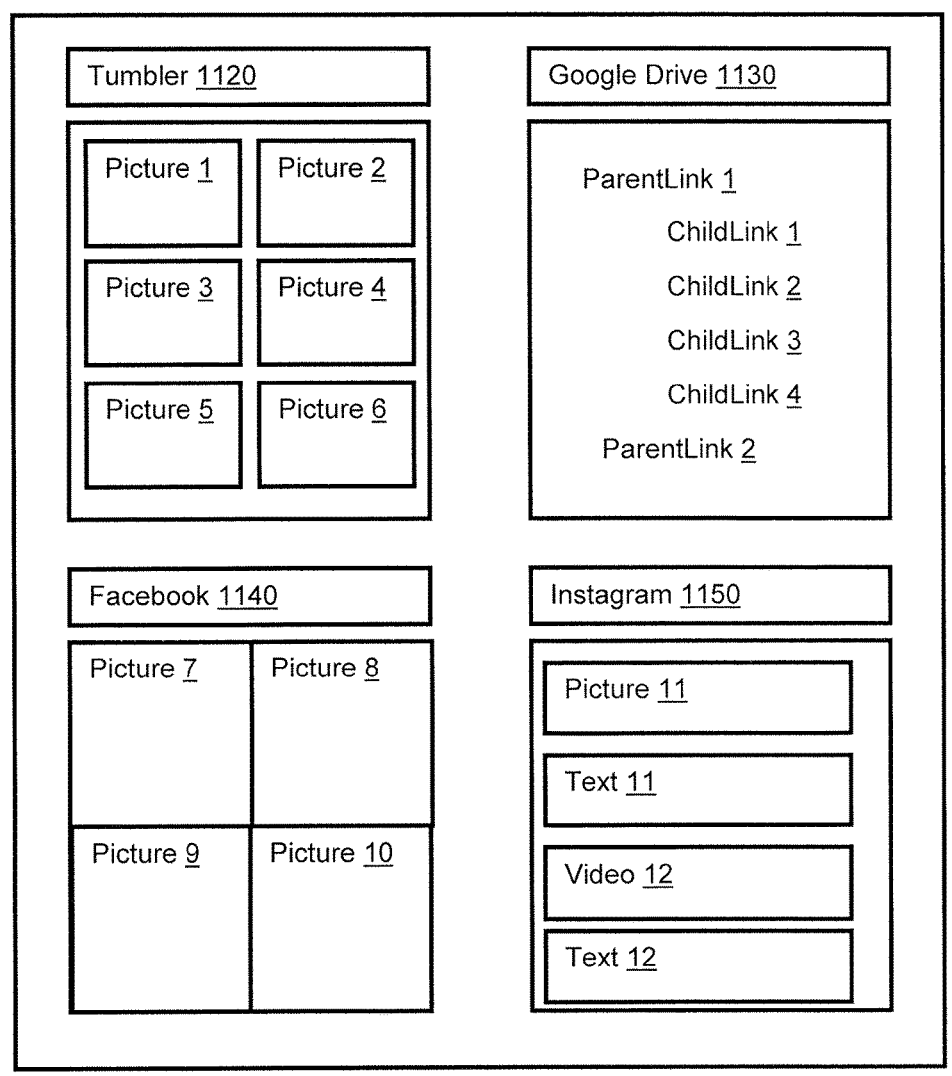
FIG. 11 is an example screen shot illustrating aggregated data that originated from four different media repositories that may be displayed to a user.

FIG. 11 illustrates an example screen shot 1100 that may be displayed on a client device 120 operated by the user 110. To create this screen shot 1100, the user 110 may have used one or more media repositories 101-103 to link data (primarily pictures in this example) to a route. As specific examples, the user may have linked Pictures 1-6 stored at media repository Tumbler™ 1120 with the route smith.com/pictures 1110, ParentLink 1-2 and ChildLink 1-4 stored on media repository Google Drive™ 1130 with the rout smith.com/pictures 1110, Picture 2-10 on media repository Facebook™ 1140 with the route smith.com/pictures 1110 and Picture 11, Text 11-12 and Video 12 stored on media repository Instagram™ 1150 with the route smith.com/pictures 1110. In this example embodiment, the user 110 may have requested all data associated with the route smith.com/pictures 1110. The system may then collect data from requested media repositories 101-103 or from all media repositories tied to the user 110 or known to be used by the user 110. The data may be displayed in any format and is preferably limited to the data associated with the requested route, which in this example is smith.com/pictures 1110. The hosting provider 130 may either access this data in database 170, if the database 170 has been updated by media repositories 101-103, or the hosting provider 130 may in real-time or near real-time request all data associated with the route smith.com/pictures 1110 from the desired media repositories 101-103. While three media repositories 101-103 are illustrated in FIG. 1 and four media repositories 1120, 1130, 1140, 1150 are illustrated in FIG. 11, any number of media repositories may be used to aggregate all related data the user 110 may have stored at the various media repositories. FIG. 11 also illustrates that a media repository, in this example, Google Drive 1130, may provide links or URLs that may be selected to retrieve the desired data that may then be displayed on the client device 120 of the user 110.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method, comprising the steps of:
   receiving and authenticating by a hosting provider a hosting provider login credentials from a user on a client device, wherein the hosting provider hosts a plurality of websites for a plurality of website operators;
   upon the hosting provider authenticating the hosting provider login credentials:
      redirecting by the hosting provider the client device to a media repository, wherein the media repository comprises a website and the media repository is configured to collect media comprising audio and video from the user on the client device and the media repository is configured to receive and authenticate a media repository login credentials from the user on the client device;
      upon the media repository authenticating the media repository login credentials:
         receiving by the hosting provider a media repository token generated by the media repository, wherein the media repository is configured to associate the media repository token with a media repository account of the user;
         generating by the hosting provider a hosting provider token;
         associating by the hosting provider the hosting provider token with a hosting provider account of the user;
         transmitting by the hosting provider the hosting provider token to the media repository;
         receiving by the hosting provider from the media repository the hosting provider token and a first instruction to manage the hosting provider account of the user; and
         upon the hosting provider receiving the hosting provider token:
            managing by the hosting provider the hosting provider account of the user according to the first instruction; and
            transmitting by the hosting provider to the media repository the media repository token and a second instruction to manage the media repository account of the user, wherein the media repository is configured to upon receiving the media repository token, manage the media repository account of the user according to the second instruction.

2. The method of claim 1, further comprising the steps of:
   receiving by the hosting provider a request for bi-directional authentication from the user on the client device; and
   receiving by the hosting provider an identity or a selection of the media repository.

3. The method of claim 1, further comprising the steps of:
   upon a second media repository, different from the media repository, authenticating a second media repository login credentials:
      receiving by the hosting provider a second media repository token generated by the second media repository, wherein the second media repository is configured to associate the second media repository token with a second media repository account of the user;
      generating by the hosting provider a second hosting provider token different than the hosting provider token;
      associating by the hosting provider the second hosting provider token with the hosting provider account of the user;
      transmitting by the hosting provider the second hosting provider token to the second media repository;
      receiving by the hosting provider from the second media repository the second hosting provider token and a third instruction to manage the hosting provider account of the user;
      upon receiving the second hosting provider token:
         managing by the hosting provider the hosting provider account of the user according to the third instruction; and
         transmitting by the hosting provider to the second media repository the second media repository token and a fourth instruction to manage the second media repository account of the user, wherein the second media repository is configured to upon receiving the second media repository token, manage the second media repository account of the user according to the fourth instruction.

4. The method of claim 2, further comprising the step of:
   notifying by the hosting provider the user on the client device of the request for bi-directional authentication.

5. The method of claim 1, wherein a route managed hosting comprises the hosting provider account of the user.

6. The method of claim 1, wherein the first instruction comprises a redirect to a website of the media repository to be stored in a database by the hosting provider.

7. The method of claim 1, wherein the first instruction comprises data to be stored in a database by the hosting provider.

8. A method, comprising the steps of:
receiving by a media repository a redirected user on a client device from a hosting provider, wherein the media repository comprises a website and the media repository is configured to collect media comprising audio and video from the user on the client device and the hosting provider is configured to receive and authenticate a hosting provider login credentials from the user, wherein the hosting provider hosts a plurality of websites for a plurality of website operators;
authenticating by the media repository a media repository login credentials from the user on the client device;
upon the media repository authenticating the media repository login credentials:
generating by the media repository a media repository token,
associating by the media repository the media repository token with a media repository account of the user, and
transmitting by the media repository the media repository token to the hosting provider;
upon the hosting provider authenticating the hosting provider login credentials:
receiving by the media repository a hosting provider token generated by the hosting provider, wherein the hosting provider is configured to associate the hosting provider token with a hosting provider account of the user;
receiving by the media repository from the hosting provider the media repository token and a second instruction to manage the media repository account of the user;
upon the media repository receiving the media repository token:
managing by the media repository the media repository account of the user according to the second instruction; and
transmitting by the media repository to the hosting provider the hosting provider token and a first instruction to manage the hosting provider account of the user, wherein the hosting provider is configured to upon receiving the hosting provider token, manage the hosting provider account of the user according to the first instruction.

9. The method of claim 8, further comprising the steps of:
receiving by the media repository a request for bi-directional authentication from the hosting provider.

10. The method of claim 8, wherein the hosting provider exchanged tokens with a plurality of media repositories.

11. The method of claim 8, further comprising the step of:
notifying by the media repository the user on the client device of the request for bi-directional authentication.

12. The method of claim 8, wherein a route managed hosting comprises the hosting provider account of the user.

13. The method of claim 8, wherein the first instruction comprises a redirect to a website of the media repository to be stored in a database by the hosting provider.

14. The method of claim 8, wherein the first instruction comprises data to be stored in a database by the hosting provider.

15. A method, comprising the steps of:
receiving and authenticating by a hosting provider a hosting provider login credentials from a user on a client device, wherein the hosting provider hosts a plurality of websites for a plurality of website operators;
upon the hosting provider authenticating the hosting provider login credentials:
redirecting by the hosting provider the client device to a media repository, wherein the media repository comprises a website and the media repository is configured to collect media comprising audio and video from the user on the client device;
receiving by the media repository the redirected user on the client device from the hosting provider;
authenticating by the media repository a media repository login credentials of the user on the client device;
upon the media repository authenticating the media repository login credentials:
generating by the media repository a media repository token;
associating by the media repository the media repository token with a media repository account of the user;
transmitting by the media repository the media repository token to the hosting provider;
receiving by the hosting provider the media repository token generated by the media repository;
generating by the hosting provider a hosting provider token;
associating by the hosting provider the hosting provider token with a hosting provider account of the user;
transmitting by the hosting provider the hosting provider token to the media repository;
receiving by the hosting provider from the media repository the hosting provider token and a first instruction to manage the hosting provider account of the user;
upon the hosting provider receiving the hosting provider token:
managing by the hosting provider the hosting provider account of the user according to the first instruction; and
transmitting by the hosting provider to the media repository the media repository token and a second instruction to manage the media repository account of the user; and
upon the media repository receiving the media repository token:
managing by the media repository the media repository account of the user according to the second instruction.

16. The method of claim 15, further comprising the steps of:
receiving by the hosting provider a request for bi-directional authentication from the user.

17. The method of claim 15, wherein the hosting provider exchanged tokens with a plurality of media repositories.

18. The method of claim 15, wherein a route managed hosting comprises the hosting provider account of the user.

19. The method of claim 15, wherein the first instruction comprises a redirect to a website of the media repository to be stored in a database by the hosting provider.

20. The method of claim 15, wherein the first instruction comprises data to be stored in a database by the hosting provider.

\* \* \* \* \*